United States Patent [19]
Andre

[11] Patent Number: 5,860,667
[45] Date of Patent: Jan. 19, 1999

[54] COUPLING FOR CONTROLLING THE ANGULAR OFFSET BETWEEN TWO ROAD TRANSPORT UNITS CONNECTED TO ONE ANOTHER BY A SELF-SUPPORTING INTERMEDIATE UNIT

[75] Inventor: Jean-Luc Andre, Obernai, France

[73] Assignee: Lohr Industrie, Hangenbieten, France

[21] Appl. No.: 750,555

[22] PCT Filed: Jun. 13, 1995

[86] PCT No.: PCT/FR95/00774

§ 371 Date: Dec. 12, 1996

§ 102(e) Date: Dec. 12, 1996

[87] PCT Pub. No.: WO95/34435

PCT Pub. Date: Dec. 21, 1995

[30] Foreign Application Priority Data

Jun. 16, 1994 [FR] France .................................. 9407555

[51] Int. Cl.⁶ ........................................................ B60D 1/30
[52] U.S. Cl. .......................................... 280/408; 280/426
[58] Field of Search .................................. 280/408, 419, 280/476.1, 474, 459, 426

[56] References Cited

U.S. PATENT DOCUMENTS

| | | | |
|---|---|---|---|
| 1,990,484 | 2/1935 | Harris | 280/426 |
| 3,062,170 | 11/1962 | Verneaux | 280/426 |
| 3,550,802 | 12/1970 | Ellerd | 280/408 |
| 4,127,202 | 11/1978 | Jennings et al. | 280/408 |
| 4,235,451 | 11/1980 | Leriverend | 280/408 |
| 5,531,468 | 7/1996 | White | 280/463 |
| 5,700,023 | 12/1997 | Picard | 280/426 |

FOREIGN PATENT DOCUMENTS 0 031 596   7/1981   European Pat. Off. .

*Primary Examiner*—Kevin Hurley
*Attorney, Agent, or Firm*—Davis and Bujold

[57] ABSTRACT

Coupling for controlling the angular offset between two road transport units (A and B) connected to one another by an intermediate self-supporting unit (C), unites (A) and (B) being respectively oriented thereto at angles $\alpha$ and $\beta$, the intermediate unit (C) being articulated to units (A) and (B) by two swiveling articulations (D) and (E). The invention consists of an oblique coupling (F) extended by a diverter (H) controlled by a cam actuator (I) for yaw angular offset control based on a law for the angular correction of angles $\beta$ as a function of angles $\alpha$, having a central region with a slight slope terminated at each of its ends by a transition region. The invention is of interest to manufacturers of articulated public road transport vehicles.

24 Claims, 5 Drawing Sheets

COUPLING FOR CONTROLLING THE ANGULAR OFFSET BETWEEN TWO ROAD TRANSPORT UNITS CONNECTED TO ONE ANOTHER BY A SELF-SUPPORTING INTERMEDIATE UNIT

The present invention concerns a coupling for controlling the angular offset between two adjacent road transport vehicles pivotably connected to one another by a self-supporting intermediate unit constituting one of the subassemblies of an articulated road vehicle.

To perform ideally on turns, articulated roadway vehicles formed of several modules or cars in series require inter-module articulations having an angular law of deviation such that the axles are permanently directed toward the center of the turn.

This is accomplished using vehicles with radiating axles.

This principle is of interest in urban transport vehicles, as it ensures minimal dynamic road traction on curves.

However, this feature is not adequate for a series of articulated vehicles with an intermediate unit interposed between them, as they twist considerably when completing a curve and exhibit pronounced lateral shifting.

The same is true for articulated road vehicles wherein each module is separated from the adjacent module by an intermediate axle-supported module and connected to each of the adjacent modules by a pivoting coupling that has a supplemental kinematic constraint consisting of an oblique rigid coupling connecting the two successive modules directly with a ball-joint connection at each end of each module.

Despite the presence of the rigid oblique coupling, there are various flaws in the performance of such articulated road vehicles which are significant enough to give rise to the present invention.

First, when these articulated road vehicle units are traveling in a straight line above a certain speed, they oscillate to the extent of threatening passenger safety.

Secondly, the purely kinematic performance of the articulated inter-module couplings causes deviation when completing a curve and, in particular, an exterior sweeping motion on turns which may, under certain conditions, exceed the recommended limit The first disadvantage can be overcome by blocking the pivoting action of one of the pivoting articulations, for example, the articulation of the front module, thereby changing the configuration to truck+trailer. Experience has shown that this association is stable up to the maximum allowed speed limit.

The mechanical result of locking the articulation adversely affects the vehicle's traction on wide turns.

However, as explained previously, urban transport conditions currently have minimal vehicle traction on turns.

Because of these accumulated requirements, using only the technique described above, that is, locking one articulation of an articulated urban transport passenger vehicle on curves, is not sufficient since it does not provide the minimal traction required throughout the entire course.

The goal of the present invention is to simultaneously eliminate the two disadvantages described above, instability when traveling above a certain speed in a straight line and lateral deviation when completing a curve, in a vehicle that also performs ideally and conforms to the regulations and requirements of public urban transport systems.

The present invention consists of a generally improved composite articulated coupling between two successive modules of the same articulated roadway vehicle, which are connected to each other by a self-supporting intermediate module that is either motorized or towed.

The general improvement in this type of articulated coupling between two successive modules, the front module and the following module being separated by an intermediate module to which they are each connected by a pivoting coupling, consists of the fact that the articulated coupling through the intermediate module and the pivoting articulations is completed by a coupling which controls angular offset in a desensitized zone in the center and on either side of the straight line direction, thus controlling orientation of the front module separately from that of the following module.

Other technical characteristics and advantages of the invention will be apparent from the following description, given by way of example, and accompanied by the drawings, wherein.

The present invention is useful in articulated road vehicles formed of a plurality of modules interconnected by a composite inter-module articulation. This composite inter-module articulation, between the front module A and the next module B, consists principally of an intermediate self-supporting module C articulated to each module A and B by articulations D and E, respectively, pivoting around a vertical axle.

A specific application of the invention concerns a composite inter-module articulation further equipped with a rigid, oblique, articulated coupling at each extremity, connected to module A and B, and constituting a sub-assembly of the articulated road vehicle.

Figure 3:
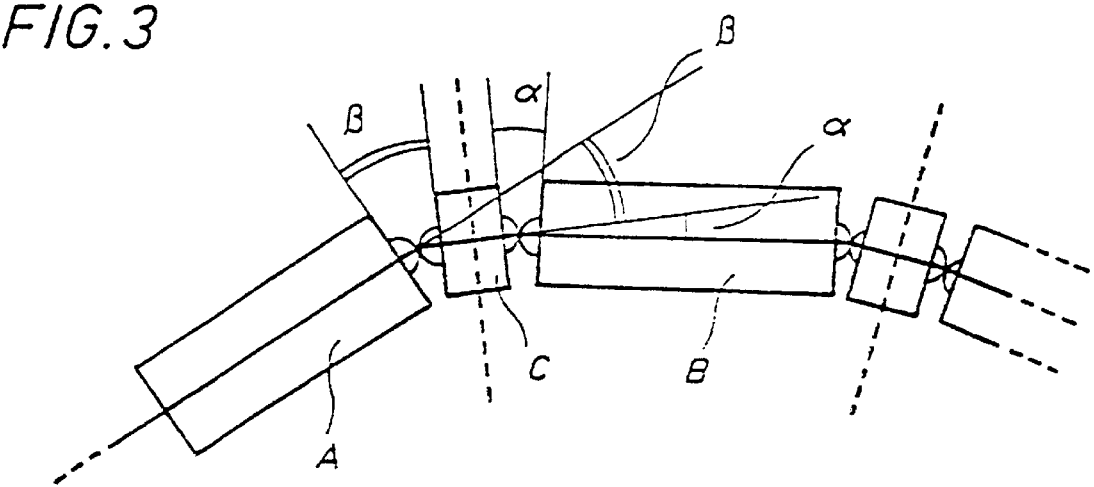
FIG. 3 is the schematic definition of angles $\alpha$ and $\beta$.

According to the invention, the coupling which controls angular offset between modules A and B articulated to each other by intermediate module C is based on the general inventive concept of providing a coupling between front module A and successive module B for correcting angular offset, and imposing an angle $\beta$ between front module A and intermediate module C (FIG. 3) according to an appropriate law of angular deviation as a function of angle a between intermediate module C and successive module B (FIG. 3). This law presents a central area that is either slightly sloped or not sloped at all for values of $\alpha$ below a predetermined value, which central zone is followed by a function of dependency between $\alpha$ and $\beta$ which noticeably reduces twisting in the modules.

Everything takes place as if the articulated composite articulation were still a straight line truck+trailer articulation on narrow turning angles, that is, as if front articulation D were locked or blocked, imposing a rigid connection between the front module and the intermediate module up to an angular limit, at which point angle $\beta$ becomes an increasing function of the turning angle.

Once it leaves this less sensitive region of angular variation, the unit performs in two modes, one called truck+ trailer mode and another called controlled deviation mode.

By construction, inter-articulation line D–E is a straight segment of constant length "d."

As previously indicated above, this type of coupling requires an adapted angular correction, upon exiting curves, for neutralizing the twisting connected to the particularity of the articulated inter-module coupling existing on composite articulated vehicles which are the subject of the invention.

Generally speaking, the corrective chain, according to the invention, consists of a rigid coupling F, which may be oblique, between module A and a block representing a corrective device G modifying the angular orientation of module A in relation to module C as a function of the orientation of module B in relation to module C.

Said device G is purely mechanical in type, that is, it is mechanically controlled, but it could also be controlled by a computer chip equipped with a sensor or some other control system.

Its function is to correct the orientation of the modules on turns, and particularly when completing curves, if the composite inter-module coupling contains only the elements known prior to the present invention.

Figure 1:
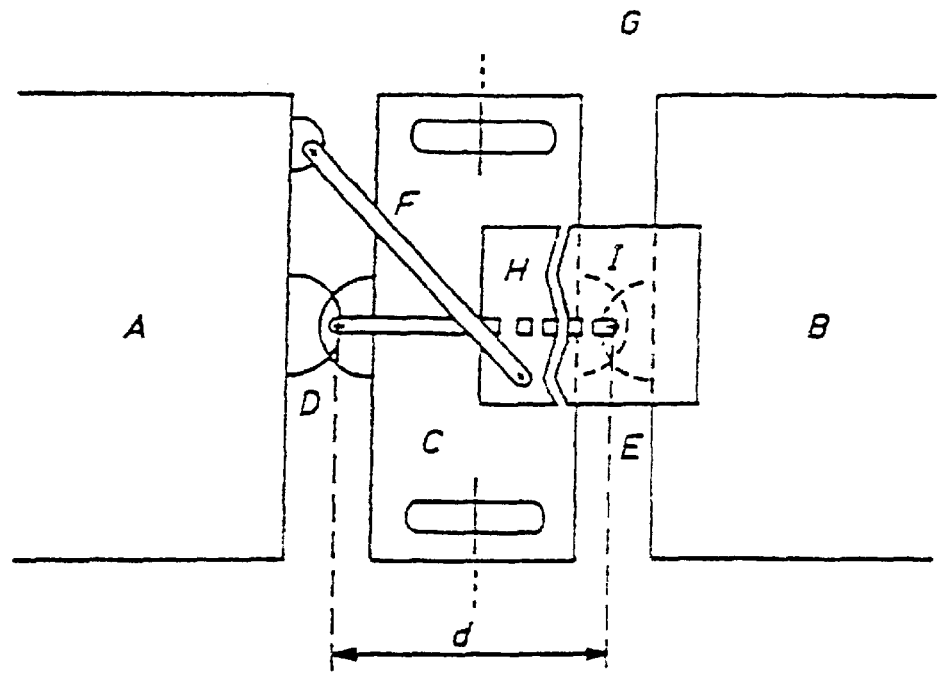
FIG. 1 is a general schematic, plan, block diagram of the articulated coupling joining two successive modules.

The general schematic representation in FIG. 1 underscores the general nature of the invention.

In general, device G is an angular correction device which modifies performance and, more specifically, the angular presentation of module A in relation to module C, or angle $\beta$, as a function of the directional position of module B in relation to module C, or angle $\alpha$, on a curve and when exiting the curve. Directional control is transmitted by oblique coupling F between front module A and device G, or by an angular sensor, or any other means for providing data on the value of angle $\alpha$.

The source of this information is the rigid oblique coupling F connecting front module A to device G which, according to a particular embodiment, takes the form of a rod articulated at its extremities to each of the modules.

The corrective device G consists of two sub-assemblies: a diverter H and an actuator I cooperating with each other.

Diverter H is articulated to front module A by coupling F which mechanically transmits angular orientation commands to this module. It is movable and it cooperates with actuator I.

Actuator I is integral with successive module B. It imposes the law of angular correction. Its role in the articulated angular correction coupling is to control angular balance by modifying angle $\beta$ and thereby better neutralizing the tendency to shift when completing turns, using an appropriate law of angular correspondence in the less sensitive central zone for slight right and left turning angles.

The composite articulated inter-module coupling functions in two modes depending upon the width of the turning angle:

truck+trailer mode for small angles of deviation between successive module B and module C, which may be $\alpha$, in which mode the pivoting movements of intermediate module C in relation to front module A corresponding to angle $\beta$ are nearly neutralized when angle $\alpha$ is small, while the movements of successive module B in relation to intermediate module C are free;

controlled mode for larger angles of deviation a between successive module B and intermediate module C, in which mode the pivoting movements of intermediate module C in relation to front module A are a function of angle $\alpha$ and are controlled by it.

Figure 15:
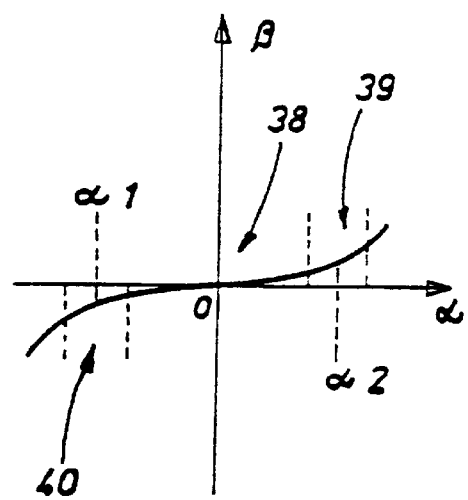
FIG. 15 shows the appearance of the curve illustrating the dependent relationship between the widths of angles $\alpha$ and $\beta$.

Switching between the two modes occurs in a transitional zone at the end of the central zone, as shown in FIG. 15.

Next, the features of invention will be examined with reference to a detailed description of several mechanical variations.

Figure 2:
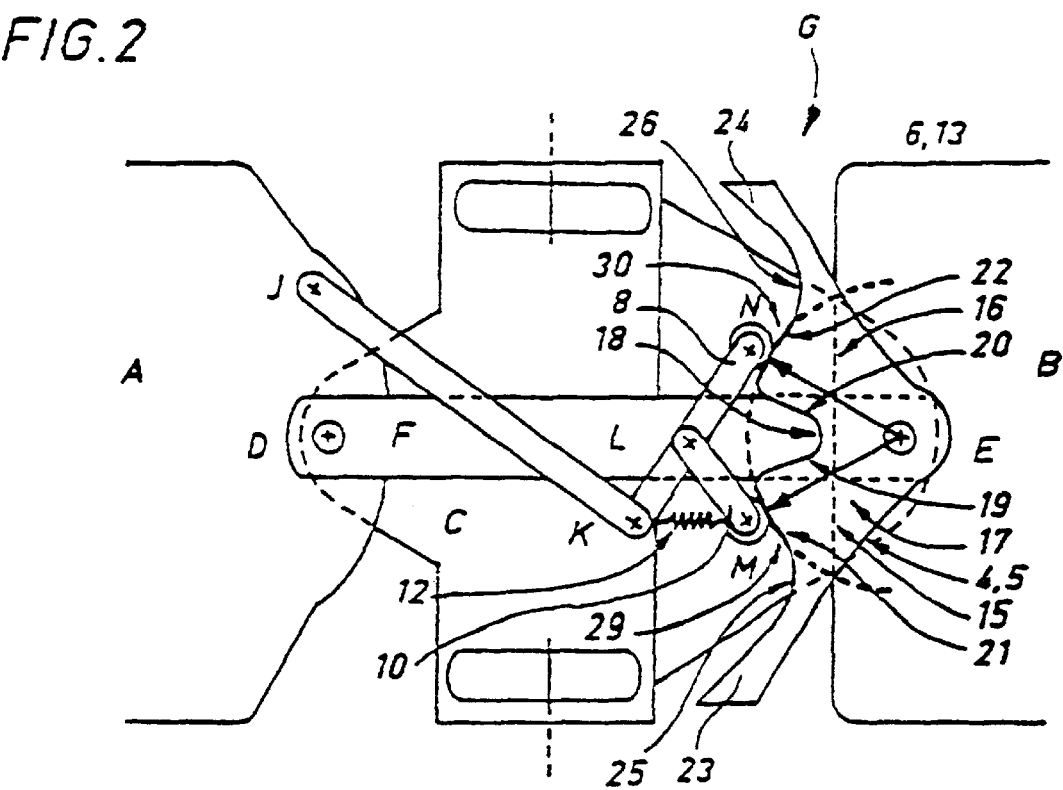
FIG. 2 is a schematic plan view showing a cam-operated variation and its general outline.
Figure 4:
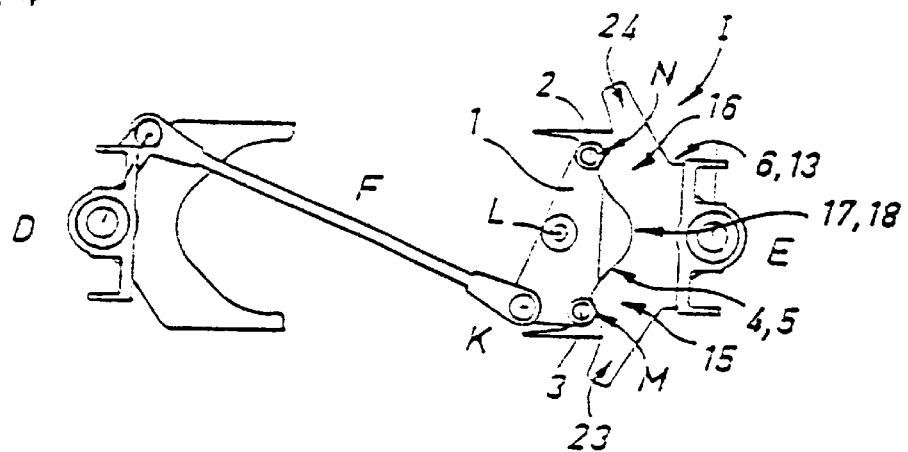
FIGS. 4, 5 and 6 are plan views of articulated couplings corresponding to the actual shapes of the cam, having either a slot or a pin.
Figure 5:
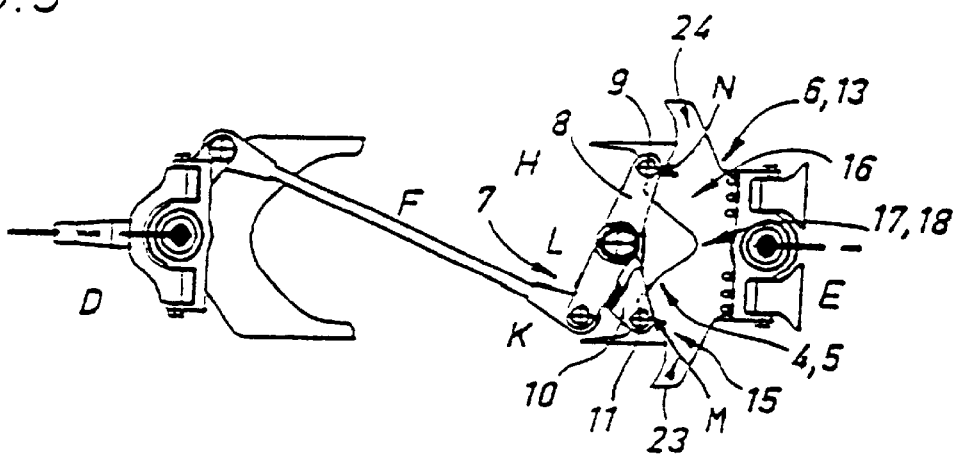

Reference is made first to FIGS. 2, 4 and 5.

The corrective chain consists generally, first, of the oblique articulated coupling F transmitting orientation control, articulated between a front articulation point J integral with the body of front module A and an articulation point K integral with diverter H pivoting on a vertical axle L supported by intermediate module C, which axle, for reasons of symmetry, intersects the line connecting articulations D and E.

Diverter H is a tilting articulated unit connected to oblique coupling F in contact with actuator I by means of at least one movable element which follows a guide track.

It may consist first of an element 1, triangular in shape, pivoting on axle L with rolling elements on the base, for example guide wheels 2 and 3, which move along edge 4 and control actuator I, contacting it at points M and N on the outer portion 5 of a control means 6 integral with the chassis of module B acting upon the rolling elements (FIG. 5).

Diverter H may also consist of an articulated unit 7 formed first of a simple rod 8 pivoting around tilting axle L, one end of which is articulated to extremity K of oblique transmission rod F, and the other extremity of which has a rolling element, for example, guide wheel 9. An auxiliary rod 10 pivotably attached to axle L completes the connection between tilting axle L and the other rolling element, also in the form of a guide wheel 11. Guide wheels 9 and 11 are also in contact at M and N with the outer edge 5 of control means 6.

To prevent this connection from becoming hyperstatic, the rods are connected to one another with a spring 12, as shown in FIG. 2, ensuring permanent contact with the guide wheels.

In the variations shown, actuator I takes the form of a cam 13 or a runner 14, which are integral with successive module B (FIG. 2, and 4, 5, 6).

The general form of cam 5 may vary according to its position on the articulated road vehicle assembly when there are several intermediate modules.

Figure 9:
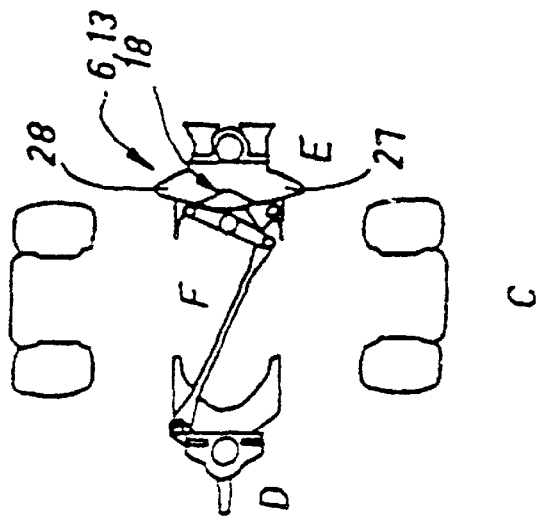
Figure 8:
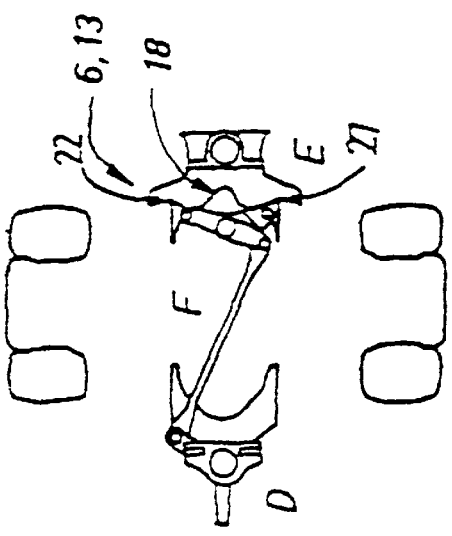
Figure 10:
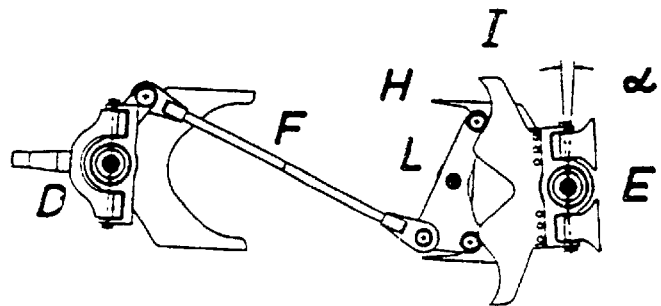
FIGS. 10 through 14 show, in a succession of schematic drawings, a sequence demonstrating the role of the cam mechanism and the variations in angles $\alpha$ and $\beta$.
Figure 11:
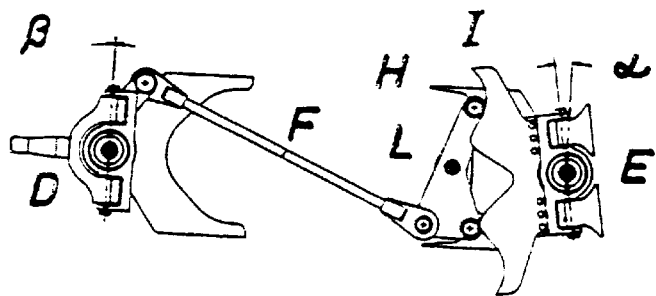
Figure 12:
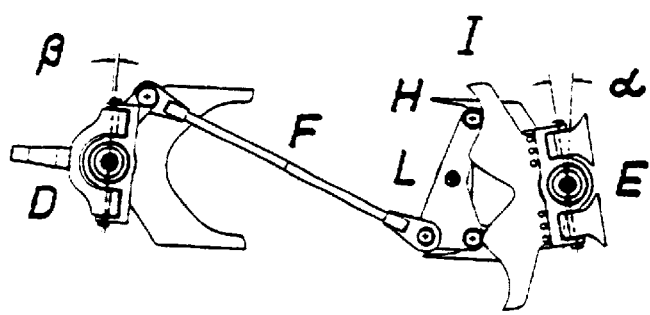
Figure 13:
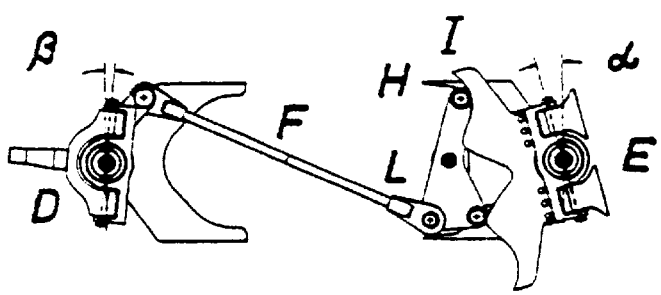
Figure 14:
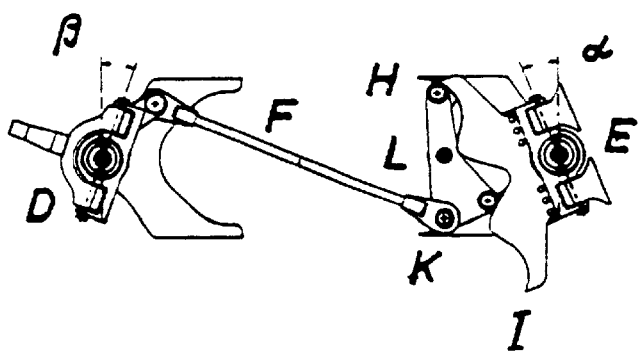

To control orientation in the dual guide wheel version, the cam is generally symmetrical in shape 5 and comprised of two half-portions 15 and 16. The central portion 17 comprises a central hollow 18, more or less pronounced, generally V-shaped and more or less flared. Each half-portion 15 and 16 has, toward the each end of cam 13, an upwardly inclined area 19 and 20, a circular, rounded portion 21 and 22, followed by a receding area 23 and 24, for example a concave portion 25 and 26, turned in the same direction as central hollow portion 18, or an inclined portion 27 and 28 as shown in FIGS. 8 and 9.

Each of the left and right rounded, circular portions 21 and 22 forms an arc 29 and 30. These arcs are identical and their center is articulation center E. These portions are shown by dashed lines in FIG. 2 and extended each time by an arrow.

The profile of the cam varies as a function of the particular law to be obtained.

Figure 7:
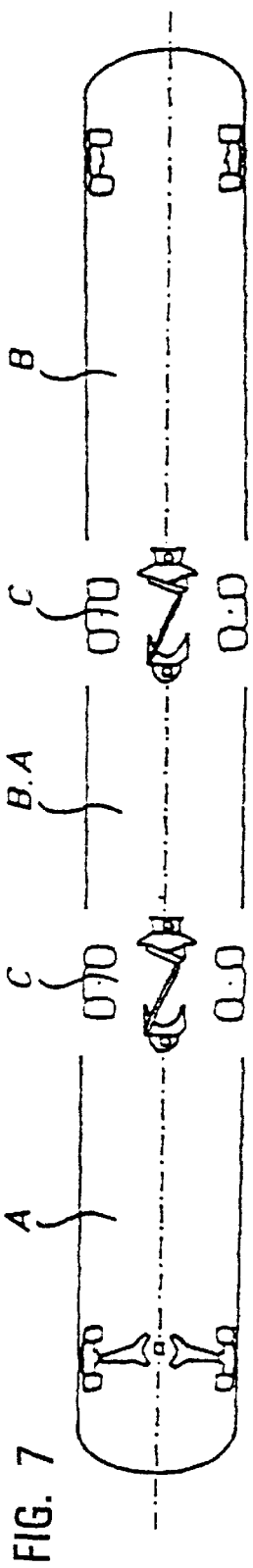
FIGS. 7, 8 and 9 show a plan view of a straight line configuration of an assembly of three modules and the detail of each of the articulated inter-module couplings.

It varies from one inter-modular coupling to another within the same articulated vehicle unit, but retains the same general appearance. Actually, because of the respective interactions between modules, and to avoid deviations in movement, the laws of variation between the angles, and consequently the shape of the cams or their mechanical equivalents, will differ from one another, as seen in FIGS. 7, 8, and 9, which show modifications in the cam profile.

Figure 6:
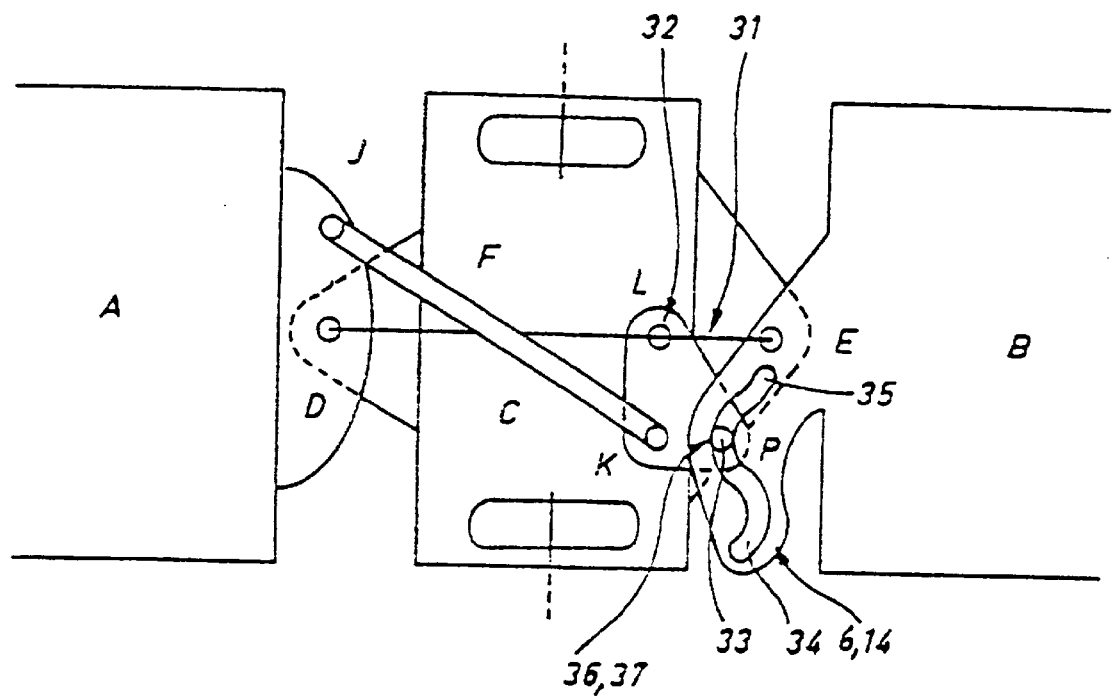

The variation shown in FIG. 6 constitutes a functional equivalent of the cam mechanisms.

According to this variation, diverter H is a plate 31 pivoting on vertical axle L, intersecting at 32 with line D–E under the influence of actuator I.

Said plate comprises, at its free end, a transverse element perpendicular to its plane, for example, a projecting pin 33, an axle tip or some other equivalent means for following a guide. In this case, actuator I serves as a guide means, for example, a slider in the form of a slot 34 along which pin 33 is displaced. Said slot 34 is formed in a horizontal plate integral with the chassis of successive module B. The outline of this slot generally corresponds to that of one of the generally symmetrical half-portions 15 or 16 of cam 5, for example, the left portion.

One of the inclined portions 35 of central concave portion 18 is also located there, and a circular portion 36 of an arc 37 with the same center as that which exists on the cam.

With reference to FIG. 3, angle $\beta$ is defined as the angle existing between the rigid inter-articulation pivoting coupling D–E and the axle of front module A. Angle $\alpha$ is defined as the angle existing between the rigid inter-articulation pivoting coupling D–E and the axle of successive module B.

Angles $\beta$ and $\alpha$ also correspond to the respective slopes between front and intermediate modules A and C, and between the latter and successive module B. They are also shown in this manner in FIG. 3.

According to the invention, angle P is a function of angle a such that:

$\beta=0$ or a progressive low value if $\alpha 1<\alpha<\alpha 2$ $\beta=f(\alpha)$ if $\alpha \geqq \alpha 2$ or $\alpha \leqq \alpha 1$ and preferably $\alpha 1=\alpha 2$ in absolute value.

Thus, the function provides an area or a central zone 38 of a low or a null value and slightly inclined within these two values $\alpha 1$ and $\alpha 2$ (FIG. 15), and at each of the extremities, a transitional zone 39 and 40.

The mechanical association formed of oblique rod F, diverter H and actuator I carries out this law, in which the limiting values exceeding $\alpha 1$ and $\alpha 2$ and the angular function depend on the profile of the cam.

To accomplish this, the cam has the generally symmetrical profile described above, formed of two essentially symmetrical half-portions. The identical effect results from using the profile of a single half-portion (FIG. 6).

It is obvious from this drawing that the first pushing or pulling movements of rod F, that is, those which correspond to the first degrees of angle $\alpha$, modify angle $\beta$ only slightly or not at all. In this case, the angular deviation movements are analogous to those of a truck+trailer type coupling, wherein modules A and C constitute the truck, and module B, the trailer.

Actually, along the entire portion of the rounded, circular cam profile, in an arc whose center corresponds to the pivoting center of articulation E, shown partly by broken lines, the pivoting motion is translated to cause the guide wheels at M and N to roll in a partial circle, the center of which corresponds to the pivoting center of successive module B, that is, that of articulation E. With a steeper incline, the pair of guide wheels deviates more; they attain, and one of them describes, the extreme portions of the cam profile, while the other attains and describes the sloped portion of the central concave element; thus, they succeed in modifying angle $\alpha$ in accordance with the desired law (FIGS. 10 through 14).

In the variation shown in FIG. 6, the slot profile again has the same circular portion corresponding to the small angles a in the truck+trailer mode.

The slight movements of the diverter wheels on these circular portions of the track play no active role in modifying the orientation of front module A in relation to intermediate module C. Control is thus neutralized on a slight angular amplitude directly connected to the length of the arc portions on the cam profile. Everything takes place as if pivoting articulation D had been locked.

If angle a increases, the cam mechanism effects a change in mode. Each of the wheels extends beyond the circular, rounded area and rolls along a portion of the track having a profile adapted to modify angle P, thus making a dependent upon P according to the appropriate law for limiting lateral deviation when exiting curves.

According to an elaborate variation, the oblique rod may provide a supplemental functional mode which exceeds the scope of the present invention In this case, there is one rod with two functional modes: a first mode in which the rod length remains fixed and the correctional device of the invention is functioning, and a second mode in which the rod length is variable and the assembly is guided by other means, with the angular correction means inoperative. The means for changing from one directional mode to the other is a control which allows either the rod to remain free or makes it rigid.

I claim:

1. A composite articulated coupling for coupling a front module (A) and a successive module (B), said composite articulated coupling comprising:

an intermediate module (C) being coupled to the front module (A) by a first pivoting articulation (D) and the intermediate module (C) and the front module (A) forming a first angle ($\beta$) therebetween, and the intermediate module (C) being coupled to the successive module (B) by a second pivoting articulation (E) and the intermediate module (C) and the successive module (B) forming a second angle ($\alpha$) therebetween;

wherein the composite articulated coupling further includes an angular offset control coupling which is at least partially supported by the intermediate module (C), the angular offset control coupling controls an angular orientation of the front module (A) relative to the successive module (B) according to a law of angular correction having a characteristic angular relationship curve, and the curve has a desensitized region (38) at a center thereof such that-when the second angle ($\alpha$) is within a predetermined range the first angle ($\beta$) has a lower rate of change, and at least one transition zone such that when the second angle ($\alpha$) is in the at least one transition zone the first angle ($\beta$) has a rate of change greater than the rate of change in the desensitized region.

2. The coupling for controlling angular offset according to claim 1, wherein the predetermined range is about 0° and the desensitized region (38) in the center is a region which is substantially flat.

3. The coupling for controlling angular offset according to claim 1, wherein extremities of the central region (38) are defined by at least opposed two transitional zones (39 and 40).

4. A composite articulated coupling for coupling a front module (A) and a successive module (B), said composite articulated coupling comprising:

an intermediate module (C) being coupled to the front module (A) by a first pivoting articulation (D) and the intermediate module (C) and the front module (A) forming a first angle ($\beta$) therebetween, and the intermediate module (C) being coupled to the successive module (B) by a second pivoting articulation (E) and the intermediate module (C) and the successive module (B) forming a second angle (a) therebetween;

wherein the composite articulated coupling further includes an angular offset control coupling which is at least partially supported by the intermediate module (C), the angular offset control coupling controls an angular orientation of the front module (A) relative to the successive module (B) according to a law of angular correction having a characteristic angular relationship curve, and the curve has a desensitized region (38) at a center thereof such that when the second angle (α) is within a predetermined range the first angle (β) has a lower rate of change, and at least one transition zone such that when the second angle (α) is in the at least one transition zone the first angle (β) has a rate of change greater than the rate of change in the desensitized region, and the angular offset control coupling also comprises an oblique rod (F) and a diverter (H) attached to a first one of the modules and controlled by an actuator (I) attached to a second one of modules.

5. The coupling for controlling angular offset according to claim 4, wherein the actuator (I) is integral with the successive module (B).

6. The coupling for controlling angular offset according to claim 4, wherein the diverter (H) is a tilting unit pivotally articulated to a pivoting axle (L), and the diverter (H) cooperates with a controlling means for controlling the actuator (I).

7. The coupling for controlling angular offset according to claim 6, wherein the pivoting axle (L) between the pivoting articulations (D and E) is supported by the intermediate module (C).

8. The coupling for controlling angular offset according to claim 6, wherein the oblique control rod (F) is articulated between the front module (A) and the pivoting articulated tilting unit (diverter H).

9. The coupling for controlling angular offset according to claim 6, wherein the actuator (I) is a cam (13) and the control means for controlling the actuator (I) is a surface (5) of the cam (13).

10. The coupling for controlling angular offset according to claim 6, wherein the tilting articulated unit is triangular in shape.

11. The coupling for controlling angular offset according to claim 10, wherein the triangular shaped tilting articulated unit is a triangular element.

12. The coupling for controlling angular offset according to the claim 11, wherein a portion of the triangular element is displaced along the surface (5) of, the cam (13) by rolling elements (2, 3).

13. The coupling for controlling angular offset according to claim 12, wherein the rolling elements (2, 3) are on the base angles of the tilting element, and apexes of the rolling elements (2, ,3) comprise an articulation point (K) with one end of the oblique rod (F).

14. The coupling for controlling angular offset according to, claim 13, wherein the surface (5) of the cam (13) has two essentially symmetrical half-portions (15, 16) separated by a generally V-shaped central hollow (18), and each half-portion (15, 16) is formed successively, from the central hollow portion (18) toward an opposed end, of a sloped portion (19, 20) and a rounded circular portion (21, 22).

15. The coupling for controlling angular offset according to claim 14, wherein each rounded circular portion (21, 22) has a common center with an adjacent pivoting articulation (E).

16. The-coupling for controlling angular offset according to claim 12, wherein the articulated vehicle includes a series of coupled modules and each pair of coupled modules has an actuator (I) which is a surface (5) of the cam (13), and the exterior surface (5) of the cam (13) varies from one actuator (I) to another actuator (I) conveyed by the articulated vehicle.

17. The coupling for controlling angular offset according to claim 4, wherein the end of the oblique rod (F) articulated to one of the modules is articulated to the portion of a body of the pivoting articulation that is integral with said module.

18. The coupling for controlling angular offset according to claim 4, wherein the diverter (H) is formed by a pivoting rod (8) articulated about a pivoting axle (L) and an annexed rod (10) also pivotally attached to the axle (L).

19. The coupling for controlling angular offset according to claim 18, wherein one end of the pivoting rod (8) is equipped with rolling means (9) while an opposed end is connected to the articulated extremity (K) of the oblique transmission rod (F).

20. The coupling for controlling angular offset according to claim 18, wherein the pivoting rod (8) and the annexed rod (10) are coupled by a spring (12).

21. The coupling for controlling angular offset according to claim 14, wherein the diverter (H) is a pivoting plate (31) with an element which follows a guide path formed in the actuator.

22. The coupling for controlling angular offset according to claim 21, wherein the guide is a slot (34) and the guide element is a pin (33) held by the diverter (H).

23. The coupling for controlling angular offset according to claim 22, wherein a contour of the guide path is one of the generally symmetrical half-portions of the surface (5) of the cam (13).

24. The coupling for controlling angular offset according to claim 14, wherein the oblique rod (F) is a telescoping rod which has a length that can be controlled to activate the angular offset control coupling.

* * * * *